C. S. LOCKWOOD.
SHEET METAL CAGE FOR ROLLER BEARINGS.
APPLICATION FILED JAN. 2, 1912.
1,063,705.
Patented June 3, 1913.
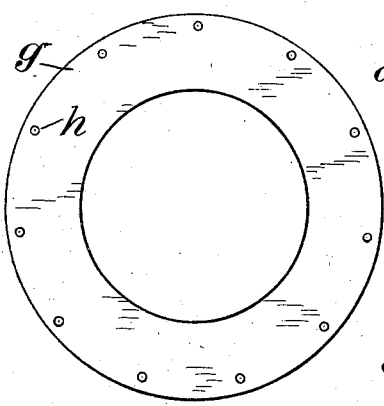
Fig. 3.
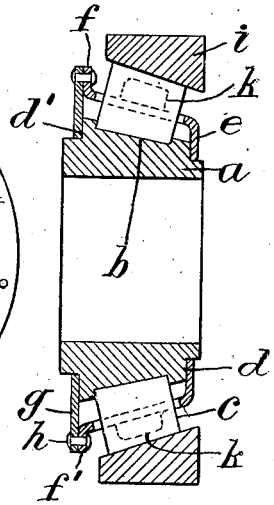
Fig. 1.
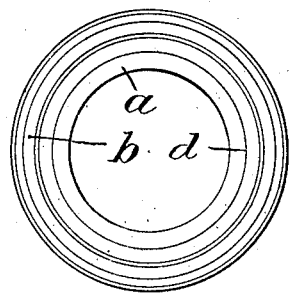
Fig. 2.
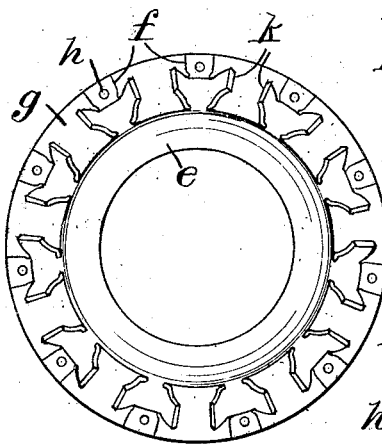
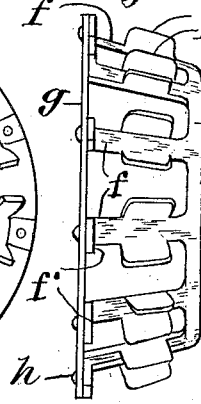
Fig. 5.
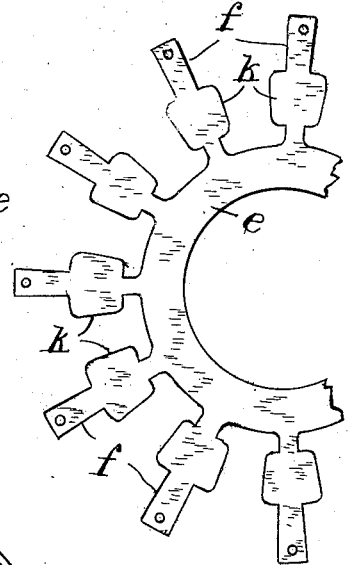
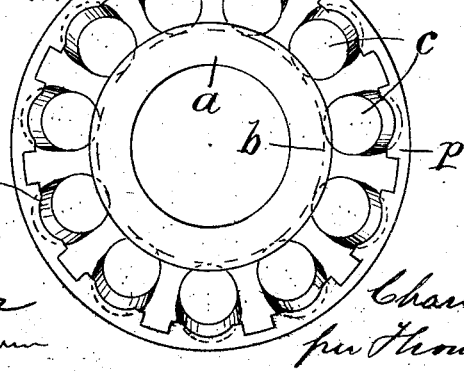
Fig. 4.
Fig. 6.
Fig. 7.
Witnesses:
Emil Fickler
J. Walter Greenlaw
Inventor:
Charles S. Lockwood,
per Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

SHEET-METAL CAGE FOR ROLLER-BEARINGS.

1,063,705. Specification of Letters Patent. Patented June 3, 1913.

Application filed January 2, 1912. Serial No. 668,833.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Sheet-Metal Cages for Roller-Bearings, fully described and represented in the following specification and the accompanying drawings, forming a part of the same.

This invention relates to a special construction for a sheet-metal cage to guide a series of rolls in their movement upon the hub of a roller-bearing and, if desired, to retain the rolls upon the hub independently of the casing so as to hold the rolls in position while adjusting the casing thereon.

The invention consists in a particular construction which is adapted to be formed of sheet-metal by punching and stamping operations, and which can thus be made with a sufficient degree of finish without any machining or polishing of the surface. Such cages have heretofore been made with sheet-metal rings at opposite ends having an integral connection with partition-bars extended between the rolls, as in my prior Patent No. 982,512 dated January 24, 1911; but where such a cage is made of tapering form to fit tapering rolls upon a tapering hub it requires a series of punching and stamping operations to form it of sheet-metal, which involves a considerable cost.

The object of the present invention is to reduce the cost of construction by making the partition-bars as prongs having an integral connection with one ring only, and therefore capable of being stamped from sheet-metal in flat form with such ring, and then bent at the desired angle and the free ends of the prongs then united if desired. This is a cheaper construction than one in which the union of the prongs is integral at both ends, which necessitates the stamping of the cage into its dish-shape before it is punched to form the prongs. If the outer ring were united integrally with the prongs and punched from a sheet therewith in flat form, the ring would be altogether larger than is required for that end of the cage. The punching of the openings between the prongs in a blank of dish-form is thus wholly avoided, and the stamping of all the prongs is effected at a single operation by punching from a flat sheet.

The invention will be understood by reference to the annexed drawing, in which—

Figure 1 is a longitudinal section of a bearing embodying the invention; Fig. 2 is an end veiw of the hub; Fig. 3 is an elevation of the collar attached to the free ends of the prongs; Fig. 4 is an end view of the cage; Fig. 5 an edge view of the cage; and Fig. 6 a view showing part of the integral ring with a portion of the prongs attached thereto as they are stamped from sheet-metal, before bending at the desired inclination to the ring. Fig. 7 shows means of assembling the parts.

$a$ designates the conical hub having a conical seat $b$ sunk in its surface and a series of rolls $c$ fitted thereto. Shoulders $d$, $d'$ are shown upon the hub at its opposite ends and the integral ring $e$ of the cage is formed to ride upon the shoulder $d$ at the smaller end of the hub. The prongs $f$ project from the ring and are inclined to the ring at the same angle as the axes of the rolls are inclined to the end of the hub. The free ends of the prongs are formed with lugs $f'$ bent outwardly into a flat plane, and such bent ends of the lugs are shown connected together by a collar $g$ and rivets $h$. A casing $i$ is shown encircling the rolls, which casing in practice is supported in a cylindrical seat so that a shaft fixed in the hub is supported from end thrust in one direction, and from lateral thrust in any direction. Lips $k$ are shown upon opposite sides of the prongs $f$ and are represented in Figs. 4 and 5 curved outwardly from opposite sides of the prongs so as to arch toward one another over the outer sides of the rolls.

Fig. 6 shows the form of the blank punched in a single operation from sheet-metal in flat form, with the ring $e$ and the prongs $f$ projecting radially therefrom. This cannot be done in a single operation if the prongs have integral rings at both ends. Such a blank may then be stamped into the form shown in Fig. 5, with the lips $k$ curved outwardly from the edges of the prongs, and the lugs $f'$ formed upon the ends of the prongs by bending them parallel with the plane of the ring $e$. In Fig. 6, holes are shown stamped in the ends of the prongs which form the lugs $f'$ when bent outwardly, as shown in Figs. 4 and 5; and the collar $g$, as shown in Fig. 4, is formed with corresponding holes to receive the rivets $h$. This construction is an improvement upon the construction of my Patent No. 982,512 granted January 24, 1911, as it makes a cage of cheaper construction, because it avoids first pressing the blank to dish-shape and punching the openings separately to receive the rolls.

Fig. 7 shows means of assembling the parts by applying the collar $g$ to the larger end of the hub and supporting the hub upon the said end with the rolls inserted in the seat $b$, and held therein and also suitably spaced by means of an outer frame $p$. The prongs of the cage are then readily inserted between the rolls and operate to retain them in the seat $b$ when the frame $p$ is removed, so that the hub, rings and cage can be handled while riveting the collar $g$ upon the ends of the prongs. By this construction the cage can be made at very trifling cost and proportioned accurately to fit the rolls upon the hub in the desired manner. It also reduces the friction of the cage to its mere contact with the sides of the rolls, which produces a minimum of friction, as but very little force is required to rotate the cage upon the hub. It also prevents any end movement of the cage, which, by means of the tapering form of the rolls and the tapering form of the pockets and lips which embrace them, would tend to wedge or jam the cage against the sides of the rolls. It also prevents any retardation of the rolls, as the hub revolves at a greater speed than the cage and thus tends to move the cage in advance of the rolls.

I do not claim the mere formation of a cage from a flat blank as that is already old, but Having described my invention I claim my particular construction as follows:

In a roller bearing, the combination, with a conical hub having a tapering roll-seat and shoulders $d$, $d'$ at its ends, of a series of tapering rolls fitted to the roll-seat, a sheet-metal cage having a flat ring at one end, a series of integral prongs extended therefrom between the rolls, lips upon the prongs embracing the outer sides of the rolls, lugs bent upon the free ends of the prongs parallel with the plane of the integral flat ring, a separate flat sheet-metal ring riveted to the flat lugs at the free ends of the prongs, and both rings fitted to ride upon the hub adjacent to the said shoulders.

In testimony whereof I have hereunto set my hand in the presence of two subscribing witnesses.

CHARLES S. LOCKWOOD.

Witnesses:
G. C. STULTS,
ETHEL WILLIAMS.